US009916480B2

(12) United States Patent
Tucker et al.

(10) Patent No.: US 9,916,480 B2
(45) Date of Patent: Mar. 13, 2018

(54) SECURITY APPARATUS TO HOUSE A DEVICE

(71) Applicant: TREND MICRO INCORPORATED, Tokyo (JP)

(72) Inventors: Paul A Tucker, Austin, TX (US); John Joseph Salazar, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 0 days.

(21) Appl. No.: 14/894,618

(22) PCT Filed: May 30, 2013

(86) PCT No.: PCT/US2013/043414
§ 371 (c)(1),
(2) Date: Nov. 30, 2015

(87) PCT Pub. No.: WO2014/193393
PCT Pub. Date: Dec. 4, 2014

(65) Prior Publication Data
US 2016/0125206 A1 May 5, 2016

(51) Int. Cl.
*G06F 21/86* (2013.01)
*G06F 21/88* (2013.01)
*G06F 1/18* (2006.01)

(52) U.S. Cl.
CPC ............. *G06F 21/86* (2013.01); *G06F 1/182* (2013.01); *G06F 21/88* (2013.01)

(58) Field of Classification Search
CPC ........... G06F 21/86; G06F 1/182; G06F 21/88
See application file for complete search history.

(56) References Cited

U.S. PATENT DOCUMENTS

| 5,783,771 | A | * | 7/1998 | Copeland | ............. | H05K 9/0073 |
| | | | | | | 174/365 |
| 6,477,041 | B2 | | 11/2002 | Aoki et al. | | |
| 7,214,874 | B2 | | 5/2007 | Dangler et al. | | |
| 7,390,976 | B2 | | 6/2008 | Liang et al. | | |

(Continued)

OTHER PUBLICATIONS

Blue Coat, "ProxySG 600 Series FIPS Compliance Guide: Tamper Evident Panel and Label Installation," Blue Coat, Apr. 2012, 10 pages, available at https://bto.bluecoat.com/doc/16473.

(Continued)

*Primary Examiner* — Mohammad A Siddiqi
(74) *Attorney, Agent, or Firm* — Okamoto & Benedicto LLP

(57) ABSTRACT

According to an example, a security apparatus to house a device may include a chassis, a front stop having a front stop wall and a front stop opening, a rear stop having a rear stop wall and a rear stop opening, a front cover to be positioned in front of the front stop having a front cover opening, in which the front stop wall blocks direct line of sight into the front opening of the chassis through the front cover opening when the front cover is positioned in front of the front stop, and a rear cover to be positioned behind the rear stop having a rear cover opening, in which the rear cover blocks direct line of sight into the rear opening of the chassis through the rear cover opening when the rear cover is positioned behind the rear stop wall.

13 Claims, 5 Drawing Sheets

(56) References Cited

U.S. PATENT DOCUMENTS

| | | | |
|---|---|---|---|
| 7,529,087 B2* | 5/2009 | Dubrule | G06F 1/20 361/679.5 |
| 7,535,861 B2 | 5/2009 | Buchholz et al. | |
| 7,643,290 B1 | 1/2010 | Narasimhan et al. | |
| 7,657,755 B2 | 2/2010 | Bricher et al. | |
| 7,722,359 B1* | 5/2010 | Frangioso, Jr. | H05K 7/1445 361/679.48 |
| 8,219,661 B2 | 7/2012 | Brown et al. | |
| 2004/0256864 A1* | 12/2004 | Erickson | E05B 65/006 292/303 |
| 2007/0201181 A1* | 8/2007 | Dubrule | H05K 5/0213 361/297 |
| 2007/0289776 A1* | 12/2007 | Liang | H05K 9/0041 174/383 |
| 2008/0037218 A1 | 2/2008 | Sharma et al. | |
| 2008/0298014 A1 | 12/2008 | Franco | |
| 2009/0116187 A1* | 5/2009 | Yi | H05K 7/20145 361/692 |
| 2013/0058052 A1 | 3/2013 | Arshad et al. | |
| 2013/0091589 A1 | 4/2013 | Shiakallis et al. | |
| 2013/0265714 A1* | 10/2013 | Tsao | G06F 1/181 361/679.53 |
| 2016/0285872 A1* | 9/2016 | Polar | H04L 63/0876 |

OTHER PUBLICATIONS

Cisco, "Installing and Wall-mounting the Cisco ASA 5505," (Research Paper), Chapter 3, retrieved online on May 30, 2013, 16 pages, available at http://www.cisco.com/en/US/docs/security/asa/hw/maintenance/5505guide/install.html.

International Search Report & Written Opinion received in PCT Application No. PCT/US2013/043414, dated Feb. 26, 2014, 9 pages.

Mcafee, "Installation Guide FIPS 140-2 Level 2 Kit," retrieved online on May 30, 2013, 9 pages, available at https://kc.mcafee.com/resources/sites/MCAFEE/content/live/PRODUCT_DOCUMENTATION/24000/PD24070/en_US/fe_S_models_ing_FIPS_700_3317A00_en_us.pdf.

* cited by examiner

SECURITY APPARATUS TO HOUSE A DEVICE

BACKGROUND

The Federal Information Processing Standard (FIPS) Publication 140-2 is a U.S. government computer security standard designed to coordinate the requirements and standards for cryptography modules that include both hardware and software components. FIPS 140-2 defines four levels of security, in which level 1 provides the lowest level of security and level 4 provides the highest level of security.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are a security apparatus to house a device and a method of assembling a security apparatus. The security apparatus disclosed herein may include a chassis, a front stop, a rear stop, a front cover, and a rear cover. In one regard, the security apparatus disclosed herein may comply with level 2 of FIPS 140-2. FIPS 140-2, level 2 includes an opacity requirement, in which an enclosure is considered to be opaque only if the device housed in the enclosure cannot be determined by visual inspection within the visible spectrum using artificial light sources shining through the enclosure openings or translucent surfaces. That is, the manufacturer, model number, design, and/or composition information of the device housed in the enclosure cannot be determined through visual inspection through the enclosure or through an opening of the enclosure. As discussed in detail below, the security apparatus disclosed herein may be formed of an opaque material and may include various features that may prevent direct line of sight into the security apparatus while also enabling air to flow through the security apparatus.

FIPS 140-2, level 2 also includes a tamper evident requirement, in which an external indication that an attempt has been made to compromise the physical security of the device housed in the enclosure is required. As discussed below, the security apparatus disclosed herein is formed of a relatively rigid material and thus, attempts at bypassing locks on the security apparatus may be evident. FIPS 140-2, level 2 further includes a requirement that locks be tamper evident or pick resistant. As discussed below, the security apparatus disclosed herein may include locks that require the use of unique and controlled keys and may thus be tamper evident or pick resistant.

The security apparatus disclosed herein may house devices of various sizes and dimensions and may thus enable users to configure and install the security apparatus on an as needed basis. In one regard, therefore, the security apparatus may accommodate multiple types of products and may thus have relatively broad applicability.

Figure 1:
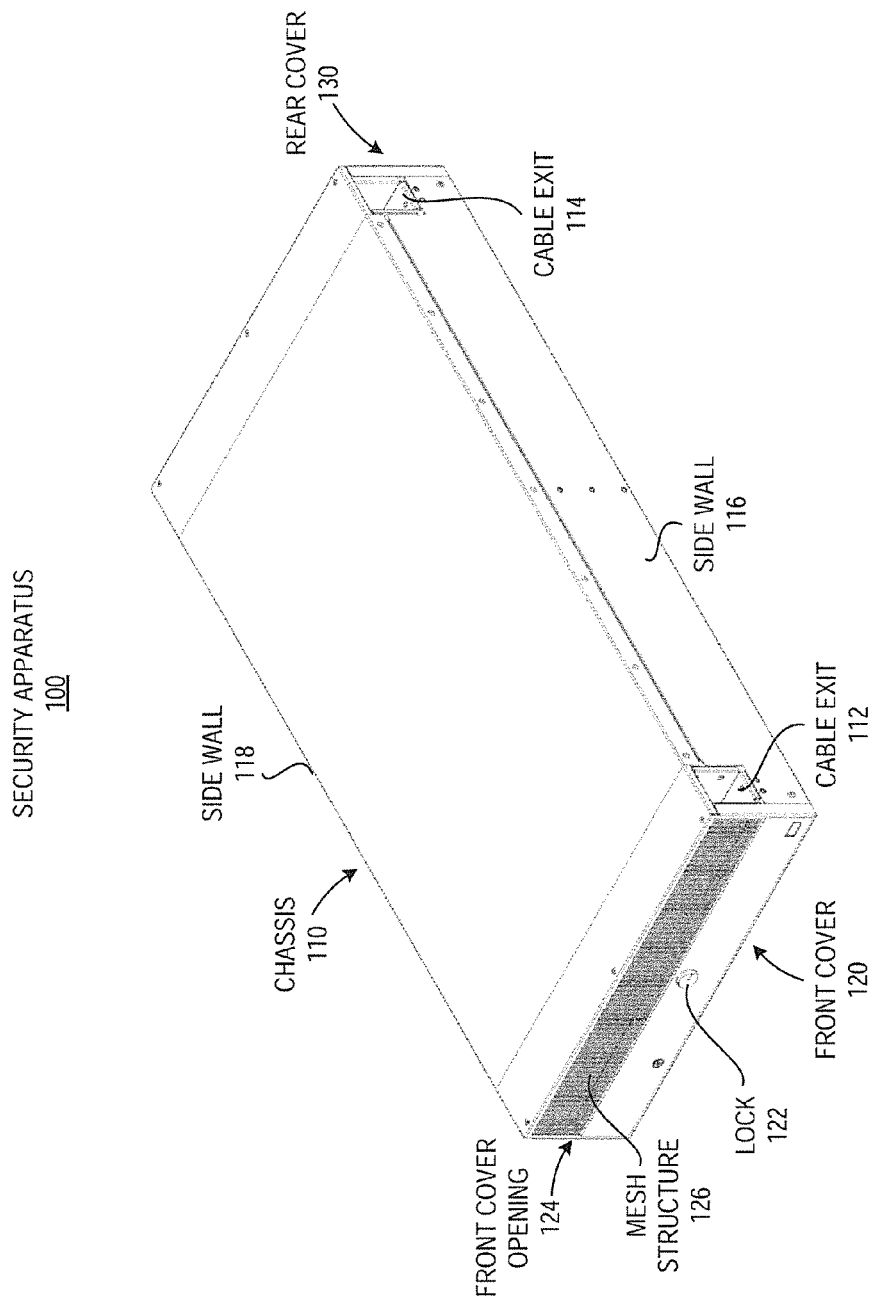
FIG. 1 depicts an isometric view of a security apparatus to house a device, according to an example of the present disclosure.

With reference first to FIG. 1, there is shown an isometric view of a security apparatus 100 to house a device, according to an example. It should be understood that the security apparatus 100 may include additional elements and that some of the elements depicted therein may be removed and/or modified without departing from a scope of the security apparatus 100.

Generally speaking, the security apparatus 100 may house a device, such as a server, an intrusion prevention system, an intrusion detection system, a router, a network switch, etc., with a level of protection that at least meets level 2 security requirements of FIPS 140-2. Thus, for instance, the security apparatus 100 may be formed to be opaque, i.e., formed of an opaque material and/or coated with an opaque material. By way of example, the security apparatus 100 may be formed of sheet metal, plastic, etc., through any suitable fabrication process. In addition, the security apparatus 100 may include various openings for air to flow into and out of the security apparatus chassis 110 and for cables to be run into the interior of the chassis 110. However, and as discussed in greater detail below, various opaque walls may be positioned either in front of or behind the openings to prevent a direct line of sight through the openings and into the interior of the chassis 110.

The security apparatus 100 may be formed of a material and into a configuration that indicates, for instance, becomes damaged, when an attempt is made to compromise the security of the security apparatus 100. That is, access to the interior of the security apparatus 100 without the appropriate key may require that the security apparatus 100 be visibly damaged. Moreover, the chassis 110 includes a front cover 120 that may be removably attached to and locked to the chassis 110 through a tamper evident or pick resistant lock 122. That is the lock 122 may require a unique and controlled key to be locked and opened. Although not shown, the lock 122 may include arms that extend into a front stop that is secured to the chassis 110. The chassis 110 also includes a rear cover 130 that may include a lock (not shown) similar to the lock 122. The lock in the rear cover 130 may also include arms that extend into a rear stop that is secured to the chassis 110.

As also shown in FIG. 1, the front cover 120 includes a front cover opening 124, in which a mesh structure 126 is positioned within the front cover opening 124. Although not shown, the rear cover 130 may also include a rear cover opening, in which a mesh structure is positioned within the rear cover opening. In other examples, the mesh structure 126 may be omitted from either or both of the front cover opening 124 and the rear cover opening. In one example, air is to flow into the interior of the chassis 110 through the front cover opening 124 and to flow out of the interior of the chassis 110 through the rear cover opening. As such the front cover opening 124 and the rear covering opening may enable air to flow through the chassis 110 and cool the components of a device housed in the chassis 110.

As further shown in FIG. 1, cable exits 112, 114 may be formed in the side walls 116, 118 of the chassis 110. Only the cable exits 112, 114 formed in the side wall 116 are depicted in FIG. 1. As discussed in greater detail herein below, the cable exits 112, 114 enable cables, such as power cables, data cables, etc., to be run into and out of the interior of the chassis 110 while a device is securely housed, i.e., locked, within the security apparatus 100.

Figure 2:
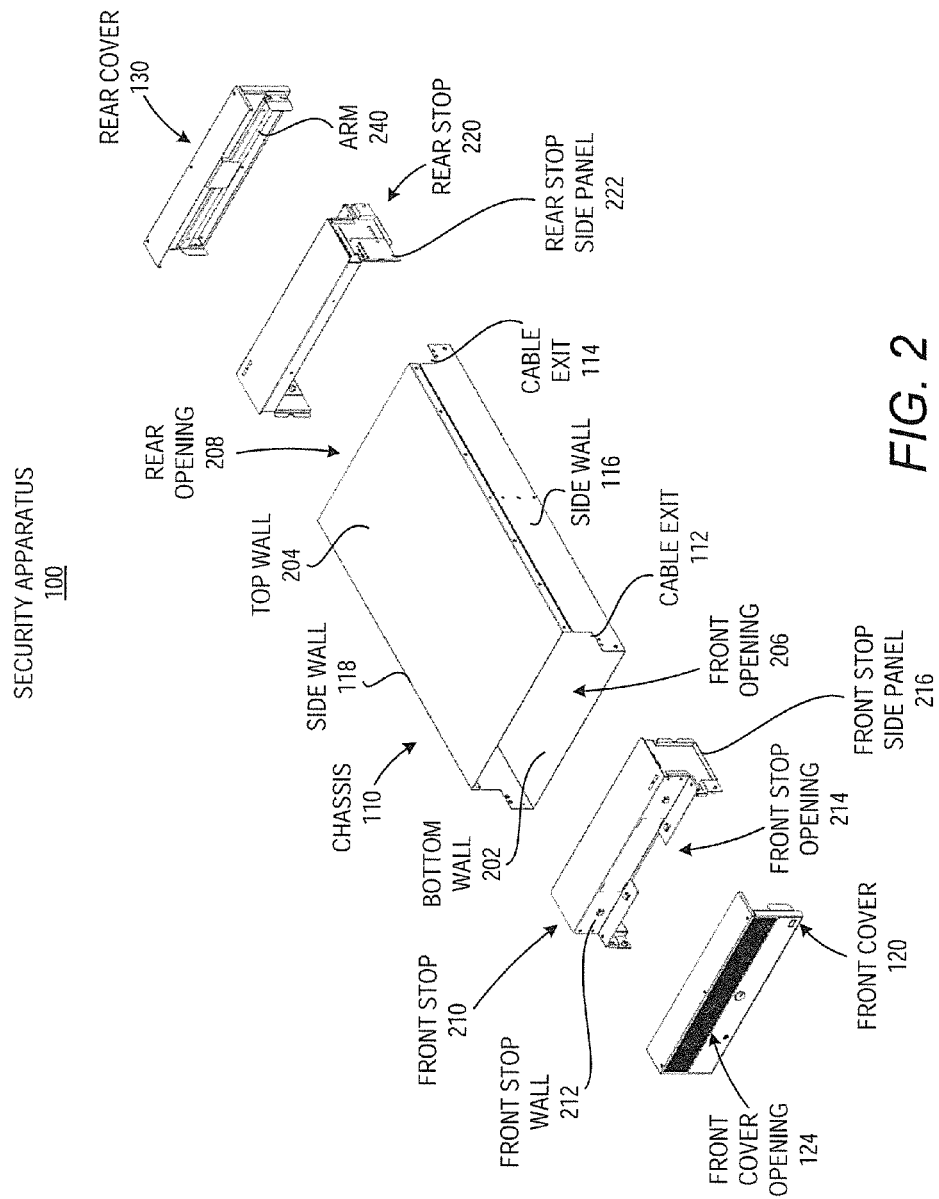
FIG. 2 depicts an exploded view of the security apparatus depicted in FIG. 1, according to an example of the present disclosure.

Turning now to FIG. 2, there is shown an exploded view of the security apparatus 100 depicted in FIG. 1. In FIG. 2, the front stop 210 and the rear stop 220 of the security apparatus 100 are more readily visible. According to an example, the front stop 210 and the rear stop 220 may generally prevent direct line of sight into the chassis 110 through the front cover opening 124 and a rear cover opening while still enable air to flow through the chassis 110. The front stop 210 and the rear stop 220 may also abut a device inserted into the chassis 110 to hold the device in place within the chassis 110. In addition, in FIG. 2, along with the side walls 116, the chassis 110 is depicted as including a bottom wall 202 and a top wall 204, in which the walls 116, 118, 202, and 204 form a structure having a front opening 206 and a rear opening 208. The side walls 116 and 118 are as depicted as being formed with notches at opposite ends thereof to provide spaces for the cable exits 112, 114.

As shown, the front stop 210 includes a front stop wall 212 and a front stop opening 214. The front stop wall 212 is also attached to two front stop side panels 216. As shown in FIG. 2, when the front cover 120 is positioned in front of the front stop 210, the front stop wall 212 blocks direct line of sight into the front opening 206 of the chassis 110 through the front cover opening 124. The front stop wall 212 also blocks direct line of sight into the front opening 206 of the chassis 110 through the cable exits 112. Although not clearly visible in FIG. 2, the rear stop 220 also includes a rear stop wall and a rear stop opening that are respectively similar to the front stop wall 212 and the front stop opening 214. The rear stop wall may also be attached to two rear stop side panels 222. Thus, for instance, the rear stop wall blocks direct line of sight into the rear opening 208 of the chassis 110 through the rear cover opening.

As also shown in FIG. 2, the side walls 116 and 118 of the chassis 110 and the front and rear stops 210, 220 include mounting slots for receipt of fasteners. Particularly, for instance, fasteners may be inserted and through interiors of the front and rear stops 210, 220 such that the fasteners may not be disengaged from an exterior of the chassis 110. The side walls 116 and 118 of the chassis 110 and/or the front and rear stops 210/220 may also include mounting holes for receipt of fasteners of mounting hardware (not shown) to mount the security apparatus 100 on an electronics rack.

FIG. 2 further shows arms 240 of a lock provided on the rear cover 130. The lock 122 in the front cover 120 may include similar arms. In any regard, the arms 240 in the rear cover 130 include features that are to mate with compatible features in the rear stop 220 and the arms in the front cover 120 include features that are to mate with compatible features in the front stop 210 when the respective locks 122 are moved into a locked position. In one regard, therefore, because the front stop 210 and the rear stop 220 may be securely fastened to the chassis 110 and the front cover 120 and the rear cover 130 may be securely fastened to respective ones of the front stop 210 and the rear step 220, access to a device housed within the security apparatus 100 may substantially be prevented when the security apparatus 100 is assembled and locked.

Figure 3:
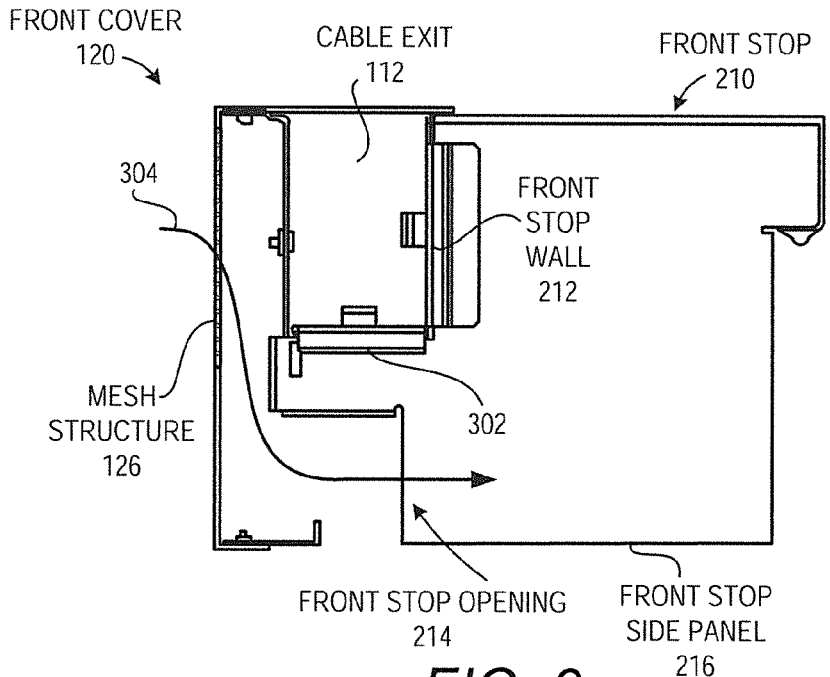
FIG. 3 depicts a cross-sectional side view of a front cover and a front stop of the security apparatus depicted in FIG. 1, according to an example of the present disclosure.

With reference now to FIG. 3, there is shown a cross-sectional side view of the front cover 120 and the front stop 210, in which the front cover 120 is positioned, for instance, in a locked arrangement with the front stop 210, according to an example. As shown therein, the front stop wall 212 is positioned behind the front cover opening 124 to therefore block direct line of sight into the front opening 206 of the chassis 110. In addition, the front stop wall 212 is spaced from the front cover opening 124 and includes a cutout 302 to enable input airflow to flow into the chassis 110 through the front cover opening 124, as denoted by the arrow 304. As such, the arrangement of the front cover 120 and the front stop 210 may enable cooling airflow to flow into the chassis 110, while blocking the interior of the chassis 110 from being visible through the front cover opening 124. Moreover, the front stop wall 212 and front stop side panels 216 are shaped to enable the cable exit 112 to be maintained between the front cover 120 and the front stop wall 212. In one regard, cables may be inserted through the cable exit 112 and through the front stop opening 214 for insertion into appropriate ports of a device housed in the security apparatus 100.

Figure 4:
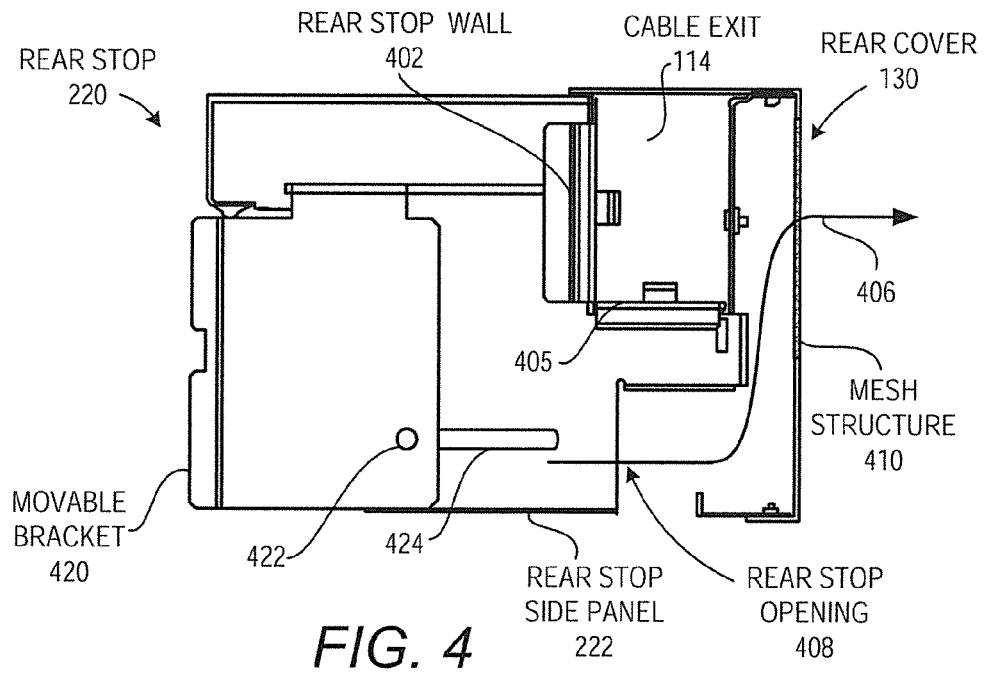
FIG. 4 depicts a cross-sectional side view of a rear cover and a rear stop of the security apparatus depicted in FIG. 1, according to an example of the present disclosure.

Turning now to FIG. 4, there is shown a cross-sectional side view of the rear cover 130 and the rear stop 220, in which the rear cover 130 is positioned, for instance, in a locked arrangement with the rear stop 220, according to an example. As shown therein, the rear stop wall 402 is positioned behind the rear cover opening 404 to therefore block direct line of sight into the rear opening 208 of the chassis 110. In addition, the rear stop wall 402 is spaced front the rear cover opening 404 and includes a cutout 405 to enable exhaust airflow to flow out of the chassis 110 through the rear cover opening 404, as denoted by the arrow 406. As such, the arrangement of the rear cover 130 and the rear stop 220 may enable heated airflow to be exhausted out of the chassis 110 through the rear stop opening 408 and through the rear cover opening 404, while blocking the interior of the chassis 110 from being visible through the rear cover opening 404. Similarly to the front cover 120, the rear cover opening 404 has been depicted as including a mesh structure 410. In other examples, however, the mesh structure 410 may be omitted or removed without departing from a scope of the security apparatus 100 disclosed herein.

Moreover, the rear stop wall 402 is shaped to enable the cable exit 114 to be maintained between the rear cover 130 and the rear stop wall 402. In one regard, cables may be inserted through the cable exit 114 and through the rear stop opening 408 for insertion into appropriate ports of a device housed in the security apparatus 100. The cables may include, for instance, power and/or data cables.

The rear stop 220 is also depicted as including a movable bracket 420 that may be slidably attached to the rear step 220 through a fastener 422 slidably held in a slot formed in a side wall of the rear stop 220. That is, the fastener 422 may include a first end that is larger than the slot 424 and a second end that is smaller than the slot 424, in which the second end is attached to the movable bracket 420. The second end of the fastener 422 may also be threaded to enable the movable bracket 420 to be locked into position as desired. A second movable bracket 420 may be slidably attached to the other wall of the rear stop 220 in a similar manner.

By way of example, the movable brackets 420 may be positioned to contact a device following insertion of the device and the rear stop 220 into the chassis 110. In one regard, the movable brackets 420 may apply force onto the device to substantially prevent the device from being shifted inside of the chassis 110.

Although the front cover 120 has been depicted as being separate from the front stop 210, it should be understood that the front cover 120 may instead be movably attached to the front stop 210. Thus, for instance, the front cover 120 may be attached to the front stop 210 through a hinge. Likewise, the rear cover 130 may be attached to the rear stop 220 through a hinge. In this example, the front cover 120 and/or the rear cover 130 may be rotated to enable access to the interior of the chassis 110. In addition, the front stop 210 and/or the rear stop 220 may include devices (not shown), such as loops, rings, cable ties, etc., to hold cables that extend into the chassis 110 interior through the cable exits 112/114.

Figure 5:
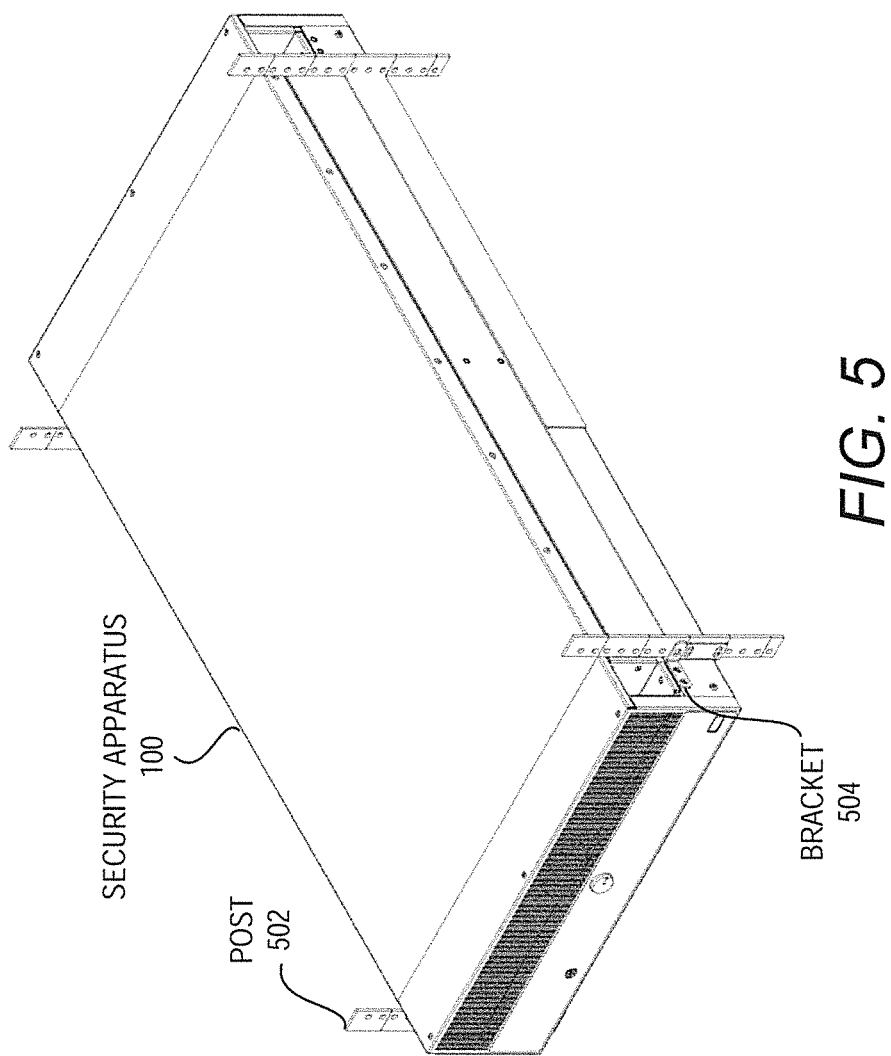
FIG. 5 shows an isometric view of the security apparatus depicted in FIG. 1 mounted to the posts of an electronics rack, according to an example of the present disclosure.

Turning now to FIG. 5, there is shown an isometric view of the security apparatus 100 mounted to the posts 502 of an electronics rack (not shown), according to an example. In FIG. 5, only portions of the posts have been depicted for purposes of simplicity. It should thus be understood that the posts 502 may extend for substantially the entire height of the electronics rack. In any regard, the security apparatus 100 may be mounted to the posts 504 through a plurality of brackets 506 and mechanical fasteners.

By way of particular example, the security apparatus 100 is 3 U tall, may house a 1 U or a 2 U electronic device, and is sized to be mounted on a conventionally sized electronics rack. In this example, the security apparatus may have a length of about 34.8 inches, a width of about 18.2 inches, and a height of about 5 inches.

Figure 6:
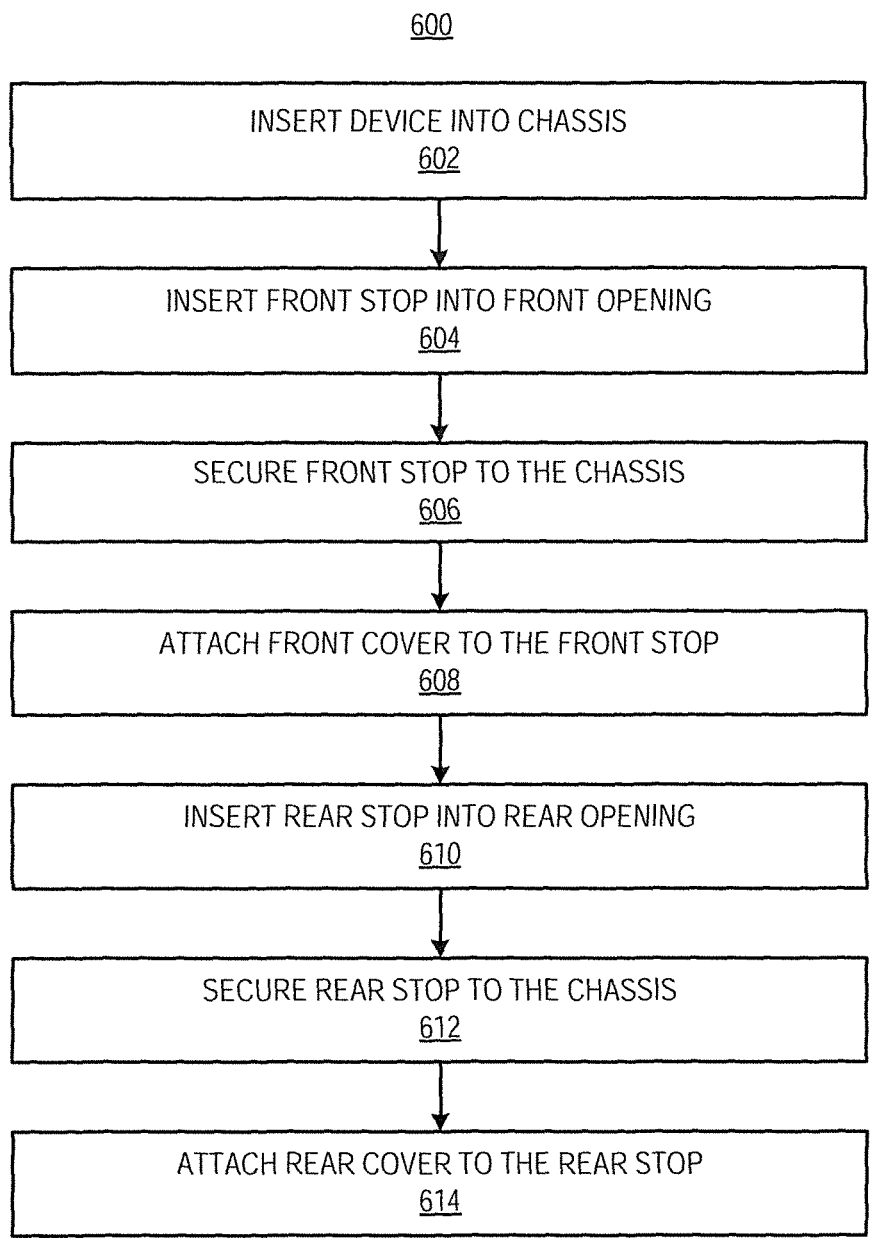
FIG. 6 shows a flow diagram of a method of assembling a security apparatus, according to an example of the present disclosure.

With reference now to FIG. 6, there is shown a flow diagram of a method 600 of assembling a security apparatus 100, according to an example. It should be apparent to those of ordinary skill in the art that the method 600 represents a generalized illustration and that other operations may be added or existing operations may be removed, modified or rearranged without departing from a scope of the method 600. In addition, although particular reference is made herein to the security apparatus 100 depicted in FIGS. 1-4, it should be understood that the method 600 may be implemented in security apparatuses having other configurations.

At block 602, a device may be inserted into the chassis 110 through one of the front opening 206 and the rear opening 208. The device may be an electronic device, such as a server, a network switch, an intrusion detection system, an intrusion prevention system, etc. In one example, the security apparatus 100 may be attached to the posts 502 of an electronics rack prior to insertion of the device into the chassis 110. In addition, following insertion of the device into the chassis 110, a cable, such as a power cable, data cable, etc., may be attached to the device.

At block 604, a front stop 210 may be inserted into the front opening 206. As shown, for instance, in FIG. 2, the front stop 210 may have a slightly smaller size as compared with the front opening 206 such that the front stop 210 fits relatively securely inside the front opening 206. In the example in which a cable is inserted into the device, the front stop 210 may be inserted into the front opening 206 while causing the cable to extend through the front stop opening 214.

At block 606, the front stop 210 may be secured to the chassis 110. More particularly, for instance, fastener holes in the front stop 210 may be aligned with mating fastener holes in the chassis 110 and mechanical fasteners may be inserted through the fastener holes in both the front stop 210 and the chassis 110. In addition, the mechanical fasteners may be inserted from which the interior of the chassis 110 to substantially prevent access to the mechanical fasteners from an exterior of the chassis 110.

At block 608, a front cover 120 may be attached to the front stop 210. According to an example, during positioning of the front cover 120 in front of the front stop 210, the cable may be maneuvered through a slot of the front stop 210 and out of a side of the front stop 210 such that the cable extends through a cable exit 112. In addition, the lock 122 in the front cover 120 may be turned through use of an appropriate key to lock the front cover 120 onto the front stop 210.

At block 610, a rear stop 220 may be inserted into the rear opening 208 of the chassis 110. As shown, for instance, in FIG. 2, the rear stop 220 may have a slightly smaller size as compared with the rear opening 208 such that the rear stop 220 fits relatively securely inside the rear opening 208. According to an example, a cable may be attached to the device through the rear opening 208. In this example, the rear stop 220 may be inserted into the rear opening 208 while causing the cable to be directed through the rear stop opening 408.

At block 612, the rear stop 220 may be secured to the chassis 110. More particularly, for instance, fastener holes in the rear stop 220 may be aligned with mating fastener holes in the chassis 110 and mechanical fasteners may be inserted through the fastener holes in both the rear stop 220 and the chassis 110. In addition, the mechanical fasteners may be inserted from which the interior of the chassis 110 to substantially prevent access to the mechanical fasteners from an exterior of the chassis 110. Moreover, a movable bracket 420 may be moved into position to contact a rear portion of the device and the movable bracket 420 may substantially be held in that position.

At block 614, a rear cover 130 may be attached to the rear stop 220. According to an example, during positioning of the rear cover 130 behind the rear stop 220, the cable may be maneuvered through a slot of the rear stop 220 and out of a side of the rear stop 220 such that the cable extends through a cable exit 114. In addition, a lock in the rear cover 130 may be turned through use of an appropriate key to lock the rear cover 130 onto the rear stop 220.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A security apparatus to house a device, said apparatus comprising:
   a chassis having a bottom wall, a top wall, two side walls, a front opening, and a rear opening;
   a front stop to be inserted into the front opening and mounted to the chassis, said front stop having a front stop wall and a front stop opening, wherein there is direct line of sight to the device through the front stop opening;
   a rear stop to be inserted into the rear opening and mounted to the chassis, said rear stop having a rear stop wall and a rear stop opening;
   a front cover to be positioned in front of the front stop, said front cover having a front cover opening and a front cover wall, wherein the front stop wall blocks direct line of sight to the device through the front cover opening and the front cover wall blocks direct line of sight to the device through the front stop opening when the front cover is positioned in front of the front stop; and
   a rear cover to be positioned behind the rear stop, said rear cover having a rear cover opening, wherein the rear cover blocks direct line of sight into the rear opening of the chassis through the rear cover opening when the rear cover is positioned behind the rear stop wall,
   wherein the front stop further comprises front stop side panels attached to the front stop wall, wherein the front stop wall is positioned along top portions of the front stop wall such that the front stop opening is formed beneath the front stop wall and between the front stop side panels.

2. The security apparatus according to claim 1, wherein the two side walls of the chassis include front slots and the front stop side panels include front stop slots, wherein the front stop slots are to be aligned with the front slots when the front stop is inserted into the front opening to enable a fastener to be inserted into a set of the front slots and the front stop slots.

3. The security apparatus according to claim 1, wherein each of the two side walls includes front notches and each of the front stop side panels include front stop notches, and wherein the front notches and the front stop notches create front cable exits when the front cover is positioned in front of the front stop.

4. The security apparatus according to claim 1, wherein the rear stop further comprises rear stop side panels attached to the rear stop wall and wherein the rear stop wall is positioned along top portions of the rear stop wall such that the rear stop opening is formed beneath the rear stop wall and between the rear stop side panels.

5. The security apparatus according to claim 4, wherein the two side walls of the chassis include rear slots and the rear stop side panels include rear stop slots, wherein the rear stop slots are to be aligned with the rear slots when the rear stop is inserted into the rear opening to enable a fastener to be inserted into a set of the rear slots and the rear stop slots.

6. The security apparatus according to claim 4, wherein each of the two side walls includes rear notches and each of the rear stop side panels include rear stop notches, and wherein the rear notches and the rear stop notches create rear cable exits when the rear cover is positioned in front of the front stop.

7. The security apparatus according to claim 1, wherein the front cover further comprises a mesh structure positioned in the front cover opening.

8. The security apparatus according to claim 1, further comprising:
   a front locking assembly having a pick resist lock to lock the front cover to the chassis; and
   a rear locking assembly having a pick resist lock to lock the rear cover to the chassis, and wherein the front cover is to be spaced from front stop wall when the front cover is locked to the chassis and the rear cover is to be spaced from the rear stop wall when the rear cover is locked to the chassis to allow air to flow through the front cover opening, the front stop opening, and into the front opening of the chassis.

9. The security apparatus according to claim 1, wherein the chassis, the front stop, the rear stop, the front cover, and the rear cover are formed to be opaque.

10. The security apparatus according to claim 1, further comprising:
    mounting hardware to mount the apparatus to an electronics rack.

11. The security apparatus according to claim 1, wherein the rear stop further comprises movable brackets that are to be moved into contact with the device following placement of the device into the security apparatus.

12. A method of assembling a security apparatus to house a device, said security apparatus having a chassis having a front opening and a rear opening, a front stop, a rear stop, a front cover, and a rear cover, said method comprising:
    inserting the front stop into the front opening, wherein the front stop comprises a front stop wall and a front stop opening, and there is direct line of sight to the device through the front stop opening;
    securing the front stop to the chassis;
    attaching the front cover to the front stop, wherein the front cover comprises a front cover opening and a front cover wall, wherein the front stop wall blocks direct line of sight to the device through the front cover opening and the front cover wall blocks direct line of sight to the device through the front stop opening;
    inserting the rear stop into the rear opening, wherein the rear stop comprises a rear stop wall and a rear stop opening;
    securing the rear stop to the chassis;
    attaching the rear cover to the rear stop, wherein the rear cover comprises a rear cover opening and wherein the rear stop wall blocks direct line of sight into the rear opening of the chassis through the rear cover opening;
    inserting the device into the chassis through one of the front opening and the rear opening prior to inserting the front stop;
    attaching a cable to the device through the front opening of the chassis prior to attaching the front cover to the front stop;
    positioning a portion of the cable to exit the security apparatus through a cable exit,
    wherein attaching the front cover comprises attaching the front cover after positioning the portion of the cable, and the front stop wall blocks direct line of sight to the device through the cable exit.

13. The method according to claim 12, further comprising:
    attaching the security apparatus to a plurality of posts of an electronics rack prior to inserting the front stop.

* * * * *